UNITED STATES PATENT OFFICE.

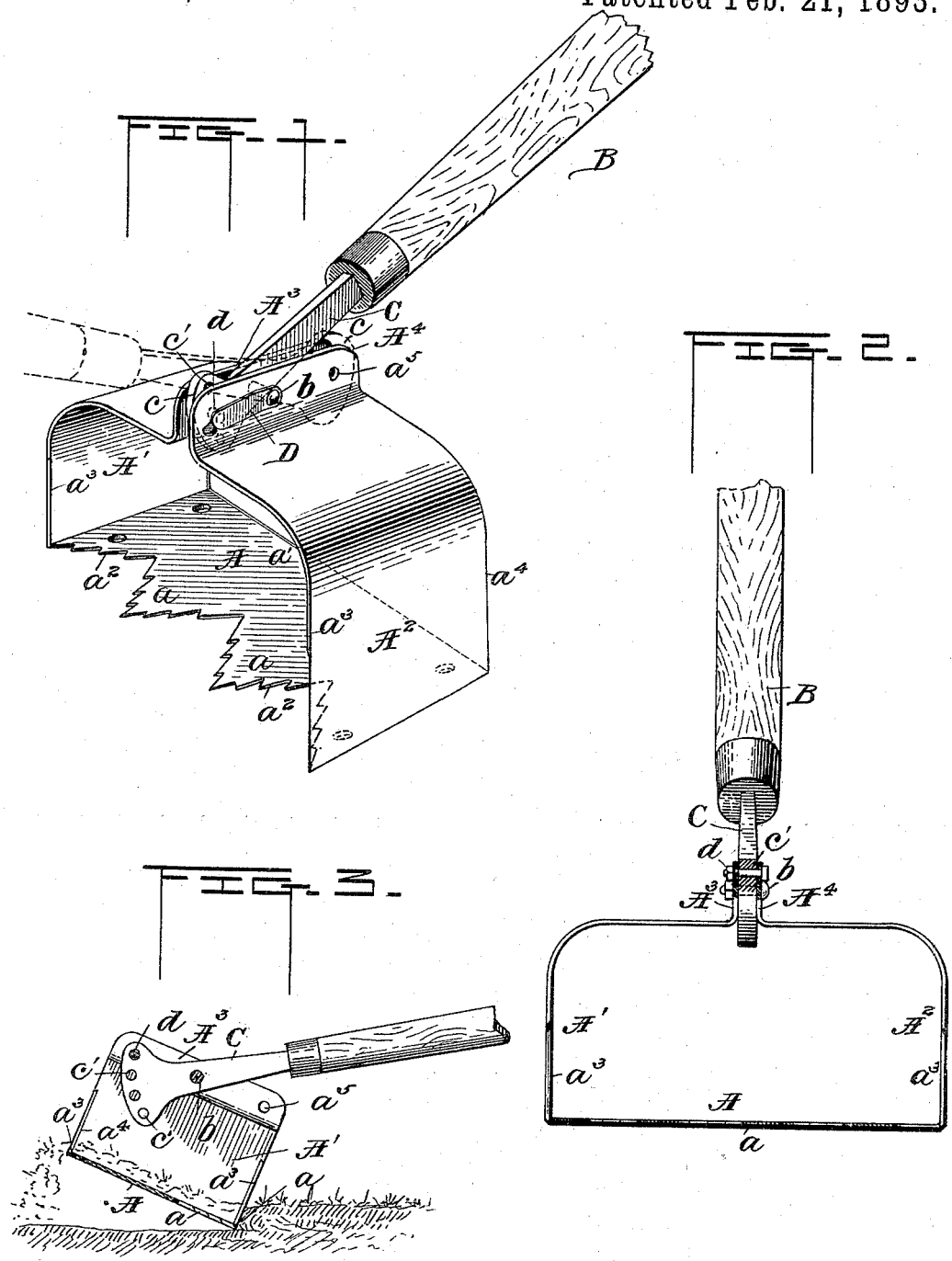

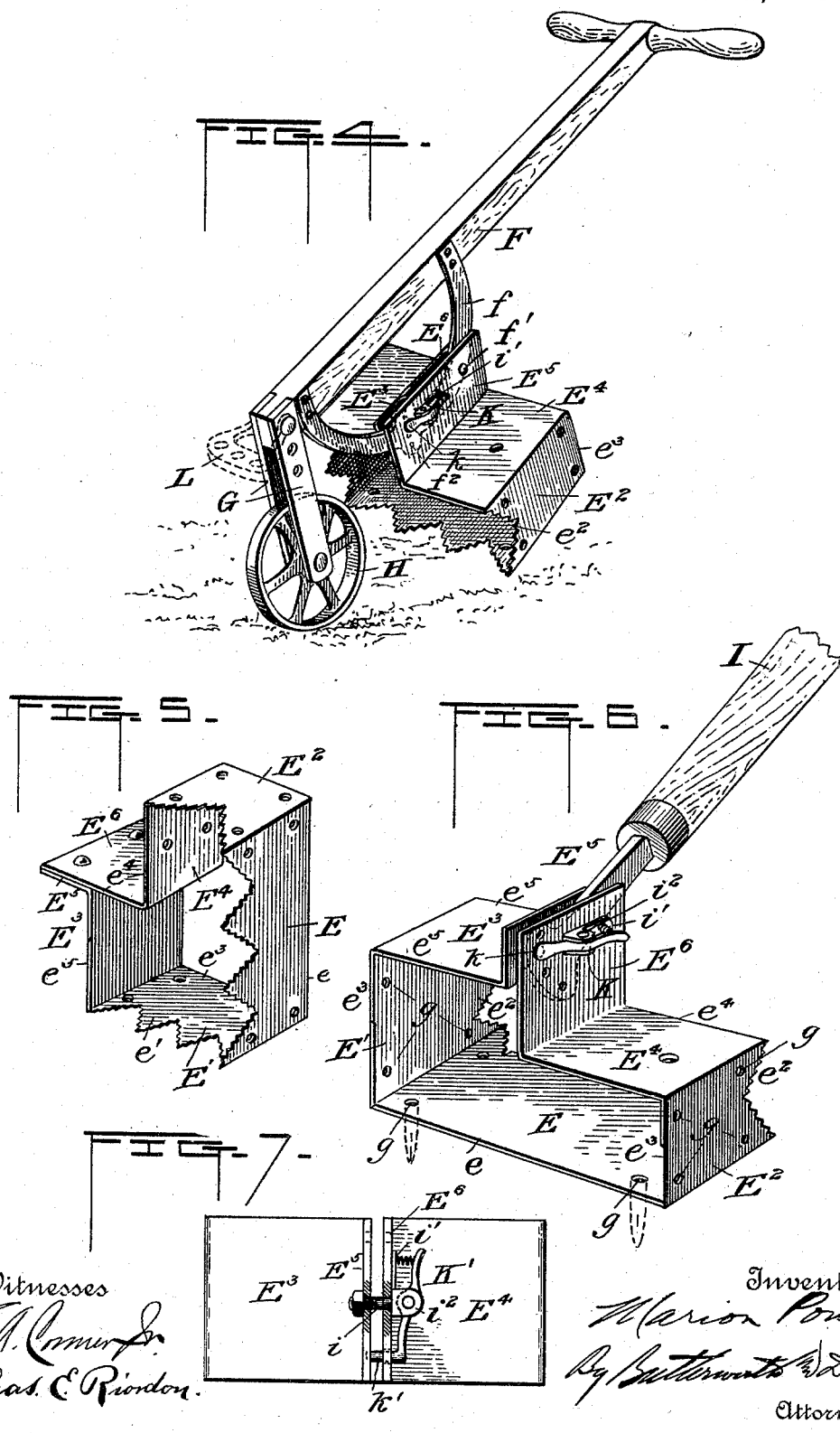

MARION POWERS, OF LEXINGTON, INDIANA.

GARDEN-TOOL.

SPECIFICATION forming part of Letters Patent No. 492,364, dated February 21, 1893.

Application filed May 25, 1892. Serial No. 434,353. (No model.)

*To all whom it may concern:*

Be it known that I, MARION POWERS, a citizen of the United States, residing at Lexington, in the county of Scott and State of Indiana, have invented certain new and useful Improvements in Garden-Tools; and I do hereby declare the following to be a full, clear, and exact description of the invention, such as will enable others skilled in the art to which it appertains to make and use the same.

My invention relates to improvements in agricultural implements, but has special reference to garden tools.

The object of the invention is to provide a convertible implement having reversible cutting edges and adapted to be used as a hand cultivator, an ordinary hoe, a scuffle hoe, a grubber, a weed extractor, or a subsoil attachment to plows, and for various other purposes to meet the requirements of the gardener.

The invention will first be described with reference to the accompanying drawings, which form a part of this specification, and then particularly pointed out and defined in the claims at the end of this description.

Referring to the drawings by letters of reference, Figure 1 represents a perspective view of an implement embodying my invention. Fig. 2 is a front view of the same partly in section. Fig. 3 is a sectional side elevation. Fig. 4 is a perspective view of a modified form of the device, showing the implement applied to a wheeled supporting bar. Fig. 5 is a perspective view of the implements shown in Fig. 4, detached from the supporting bar. Fig. 6 is a perspective view of the latter implement with an ordinary handle attached, and Fig. 7 is a sectional plan view illustrating the method of attaching the handle.

Similar letters of reference are used to denote similar parts in each of the several views.

A denotes a horizontal cutter-bar or blade having a toothed cutting edge $a$, and a straight cutting edge $a'$ and which may be formed integrally with upright or vertically disposed side cutters or blades $A'$, $A^2$ which have front and rear cutting edges $a^3$, $a^4$. The free ends of the side blades $A'$, $A^2$, are bent inwardly substantially parallel with the horizontal blade A, and terminate in upturned portions or flanges $A^3$, $A^4$, which are perforated at $a^5$ to receive the fastening bolts for the attachment of the handle B.

The handle B is provided with a flat metallic plate or tang C having an enlarged head $c$, which is provided with a series of holes or perforations $c'$ to receive the fastening bolts by which the handle is secured in proper position. The handle may be secured to the blade by suitable bolts and nuts as indicated in Fig. 2, but I preferably pivot the tang C centrally of the flanges $A^3$, $A^4$ by means of a through bolt $b$, which forms the pivotal center of a spring D which carries a stud or pin $d$, adapted to engage any one of the series of perforations $c'$ in the plate C, so as to afford a ready means of adjustment when it is desired to shift the handle from the position indicated in full lines in Fig. 1 to the position indicated in dotted lines in said figure; this adjustment being made by merely withdrawing the bolt $d$ against the pressure of spring plate D, and then turning the spring plate upon its pivotal center so as to cause the stud or pin $d$ to engage the perforation $a^5$, at the rear of the flanges and any one of the series of perforations $c'$, in the tang C, when the latter is thrown into proper position. The blade A may have straight cutting edges but I preferably form one edge with teeth or cutters, and serrate the edges of these teeth as shown at $a^2$, to adapt such edge to readily sever stubs, roots, weeds, grass, &c.

In Figs. 4 to 7 of the drawings is shown a single steel plate bent so as to form three cutting blades E, E', $E^2$, of different widths, to adapt the implement for cultivating between rows of plants varying in width; the plate being bent so as to provide vertically disposed front and rear cutting edges for each blade that is being used. The horizontal blade E is formed with a straight cutting edge $e$, and with a serrated-toothed edge $e'$ while the side blades E', $E^2$, have V-shaped or serrated cutting edges $e^3$, $e^2$, and straight cutting edges $e^3$; but straight edges may be provided if desired. The inwardly bent portions $E^3$, $E^4$, of the side blades form right-angled extensions having cutting edges $e^4$, $e^5$, and upturned ends $E^5$, $E^6$, having perforations therein for the attachment of the handle-bar or other supporting means.

In Fig. 4 the handle-bar F is provided with a depending curved bar $f$, which may be adjustably secured to the right-angled portions or flanges $E^5$, $E^6$, by a pivot bolt $f'$, and pin or detent $k$, fixed to a spring-pressed thumb latch $K'$ and adapted to enter any one of a series of perforations, $f^2$ in the bar $f$ for the purpose of changing the angle of the blade. The handle-bar is also provided with standards G, G, in which may be journaled a vertically adjustable supporting wheel H.

In Fig. 6 the handle I is provided with a shank having an enlarged head with a series of perforations the same as described with reference to Figs. 1, 2 and 3, but in this instance the pivot bolt $i$, is provided at one end with a plate $i'$ which has ears $i^2$, $i^3$, thereon between which is pivoted a thumb latch $K'$ having a detent or pin $k'$, adapted to engage any one of a series of perforations in the head of the shank C, so as to hold the implement at any desired angle to the handle. A spring $i^3$ is interposed between the plate $i'$ and the free end of the thumb lever $K'$, so as to cause the detent $k'$ to normally engage with the perforations in the shank of the handle, but by pressing the thumb upon the free end of the latch or pawl $K'$ the detent may be withdrawn to permit the handle and latch to be reversed so as to place either the toothed or straight edges of the blades in front of the handle at will.

The implement thus constructed is adapted to be used for various purposes, but particularly in cultivating between plants placed in narrow rows, as for instance celery, &c.

Either of the three blades shown in Figs. 4 to 7 may be used, by pulling and striking, as with an ordinary hoe, or by pushing, as with a scuffle hoe, the horizontal blade E being adapted for moderately wide rows, the side blade E', for rows of less width, and the blade $E^2$ for very narrow rows. In using either side blade, as will be observed, the horizontal blade and one or the other of the right-angled portions $E^3$, $E^4$, will serve as vertically disposed side cutters for the blade that is in use. These side blades, in both forms shown, are also of advantage in trimming the edges of walks, and when cultivating between young plants placed in narrow rows they serve as guards to prevent clods of dirt from being thrown upon the plants.

In some cases it may be desirable to attach a draft animal to the implement, and for this purpose a clevis L (Fig. 4) may be secured to the front end of the handle or handle-bar for the attachment of a whiffletree.

The implement is also adapted to be used as an attachment to plows or cultivators and may be placed either in front or in rear of the plow or other farm implement, and supported on wheels if desired in any well known manner. By reason of the peculiar method of bending the steel plate so as to form the horizontal and vertical blades and parallel plates or flanges (in a single piece) the several parts mutually brace and sustain each other and thereby form an efficient and durable implement adapted to a variety of uses.

For the purpose of providing means for attaching land markers, small turned plows, rakes or other garden tools to the implement, I preferably perforate each of the blades E, E', $E^2$, as at $g$, $g$, to receive bolts for securing such plows, markers or the like.

If desired the upturned plates or flanges may be welded or riveted together and suitably perforated to receive the bolts for securing the handle or handle-bar thereto; in which case the tang or attaching plate may be secured at either side of the upturned plates instead of between said plates as shown. It may also be desirable in using the side blades to provide a handle with a bent tang or shank or other means such as will readily suggest themselves to the user for securing the proper degree of inclination between the handle and the blade in use.

Having thus fully described my invention, what I claim as new, and desire to secure by Letters Patent of the United States, is—

1. A garden tool comprising a main horizontal reversible blade having a straight cutting edge and a serrated-toothed edge and provided with vertically disposed side blades each having front and rear cutting edges; said side blades having their free ends turned inwardly and terminating centrally above the main blade in perforated plates or flanges, extending parallel with the side blades a reversible handle and means for adjustably securing the handle to said flanges, substantially as described.

2. A garden tool comprising a main horizontal reversible blade provided with vertically disposed side wings or blades each having front and rear cutting edges; said side blades having inturned portions, which terminate centrally of the main blade in upturned perforated plates or flanges which extend parallel with said side blades, together with the reversible handle having the shank with enlarged head provided with a series of perforations therein, to receive the fastening bolts for reversibly and adjustably securing said shank to said flanges, substantially as described.

3. A garden tool comprising a main horizontal blade having front and rear cutting edges, one edge being straight and the other provided with serrated teeth or cutters; said blade having side wings or blades formed with vertically disposed front and rear cutting edges and with inturned portions which terminate in upturned perforated plates or flanges for the attachment of a handle, together with a reversible handle and means for adjustably securing the latter to said flanges, substantially as described.

4. In a garden tool the reversible blade provided with front and rear cutting edges, one edge being straight and the other toothed, said teeth having serrated cutting edges, substantially as described.

5. A garden implement comprising a main horizontal blade, and side wings or blades arranged at right angles to the former, each blade having a front and rear cutting edge; the side blades being provided with right-angled portions extending inwardly parallel with the horizontal blade and having cutting edges, and terminating in upturned plates or flanges with perforations therein, to receive the fastening bolts of the operating handle or other support, substantially as described.

6. In combination with the implement having the horizontally and vertically disposed blades and perforated flanges formed integral therewith, the reversible handle having the shank with enlarged head provided with a series of perforations therein, and the swiveled spring pressed pin adapted to be thrown into engagement with the perforations in either position of the handle, substantially as described.

7. A garden tool comprising a steel plate bent so as to form a main horizontal blade and two side or vertically disposed blades, one of the latter being narrower than the other, and both narrower than the main blade; said side blades being provided with right-angled portions extending inwardly parallel with the main blade and thence upwardly so as to form plates or flanges for attachment to a supporting bar or handle, substantially as described.

In testimony whereof I affix my signature in presence of two witnesses.

MARION POWERS.

Witnesses:
CHAS. E. RIORDON,
N. E. McCABE.